US012784672B2

(12) United States Patent
Wang et al.

(10) Patent No.: US 12,784,672 B2
(45) Date of Patent: Nov. 3, 2026

(54) ORGANIC LIGHT-EMITTING DIODE (OLED) DISPLAY PANEL OVERCOMING FLICKER PROBLEM DURING POWER ON

(71) Applicant: Everdisplay Optronics (Shanghai) Co., Ltd., Shanghai (CN)

(72) Inventors: Qi Wang, Shanghai (CN); Ying-Hsiang Tseng, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/681,885

(22) PCT Filed: Apr. 17, 2023

(86) PCT No.: PCT/CN2023/088656
§ 371 (c)(1),
(2) Date: Feb. 7, 2024

(87) PCT Pub. No.: WO2024/138957
PCT Pub. Date: Jul. 4, 2024

(65) Prior Publication Data
US 2025/0140180 A1 May 1, 2025

(30) Foreign Application Priority Data
Dec. 29, 2022 (CN) ......................... 202211708232.3

(51) Int. Cl.
*G09G 3/3225* (2016.01)

(52) U.S. Cl.
CPC ....... *G09G 3/3225* (2013.01); *G09G 2310/08* (2013.01); *G09G 2320/0247* (2013.01); *G09G 2330/02* (2013.01)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

2007/0079191 A1* 4/2007 Shin ........................ G09G 3/325 714/726
2014/0092144 A1* 4/2014 Kim ..................... G09G 3/3291 345/76
(Continued)

FOREIGN PATENT DOCUMENTS

CN 205354617 U 6/2016
CN 108550347 A 9/2018
(Continued)

OTHER PUBLICATIONS

International Search Report dated Sep. 6, 2023 of International Application No. PCT/CN2023/088656.

*Primary Examiner* — Ke Xiao
*Assistant Examiner* — Nelson Lam
(74) *Attorney, Agent, or Firm* — Qinghong Xu

(57) ABSTRACT

The present disclosure provides a display panel, a turn-on driving method thereof and a display apparatus. The display panel includes a display area and a non-display area; the display area includes a plurality of rows of pixel units, and the non-display area includes a light-emitting control signal driving circuit, and the light-emitting control signal driving circuit is connected to the pixel units; the light-emitting control signal driving circuit includes n cascaded driving circuit units, an output terminal of each of the driving circuit units is provided with an output track and the output track is electrically connected to at least one row of pixel units and a transistor respectively; a first terminal of the transistor is connected to a first signal; a second terminal of the transistor is connected a the second signal, and a third terminal of the transistor is connected to the output track.

19 Claims, 4 Drawing Sheets

(58) Field of Classification Search
CPC .... G09G 3/3233; G09G 3/3241; G09G 3/325; G09G 3/3258; G09G 3/3266; G09G 3/3275; G09G 3/3283; G09G 3/3291
USPC ........................................................ 345/76–83
See application file for complete search history.

(56) References Cited

U.S. PATENT DOCUMENTS

| | | | | |
|---|---|---|---|---|
| 2014/0168184 | A1* | 6/2014 | Kim | G09G 3/3233 345/79 |
| 2015/0138180 | A1* | 5/2015 | Park | G09G 3/3233 345/212 |
| 2015/0279272 | A1* | 10/2015 | Takahara | G09G 3/3233 345/76 |
| 2015/0356913 | A1* | 12/2015 | Kim | G09G 3/3266 345/215 |
| 2015/0364083 | A1* | 12/2015 | Jeon | G09G 3/3233 345/76 |
| 2015/0379935 | A1* | 12/2015 | Choi | G11C 19/28 345/204 |
| 2016/0163264 | A1* | 6/2016 | Nishimura | G09G 3/3266 345/212 |
| 2016/0189794 | A1* | 6/2016 | Lou | G09G 3/3266 345/100 |
| 2018/0174503 | A1* | 6/2018 | Shim | G11C 19/184 |

FOREIGN PATENT DOCUMENTS

| | | | |
|---|---|---|---|
| CN | 109448627 | A | 3/2019 |
| CN | 112735314 | A | 4/2021 |
| CN | 115394244 | A | 11/2022 |
| CN | 115410538 | A | 11/2022 |
| KR | 20050113706 | A | 12/2005 |
| KR | 20140091399 | A | 7/2014 |

* cited by examiner

ORGANIC LIGHT-EMITTING DIODE (OLED) DISPLAY PANEL OVERCOMING FLICKER PROBLEM DURING POWER ON

CROSS-REFERENCE TO RELATED APPLICATION

The present disclosure is an US national phase of International Application No. PCT/CN2023/088656, filed on Apr. 17, 2023, which is based upon and claims priority to Chinese Patent Application No. 202211708232.3, filed Dec. 29, 2022, and the entire content of which is incorporated herein by reference.

TECHNICAL FIELD

The present disclosure relates to the field of display technology, and in particular, to a display panel, a turn-on driving method thereof and a display apparatus.

BACKGROUND

As shown in FIG. 1, in the display panel in the related art, an output track En' of a light-emitting control signal driving (emission driver on array (EOA)) circuit 21' of a non-display area 2' of the display panel is connected to an active area (AA) 1', and the light emission of the pixel unit OLED in the display area 1' is controlled through the output track En'. There is a certain resistance and capacitance in the output track En'. As shown in FIG. 2, when the transistor in the pixel driving circuit is a P-type thin film transistor, the pixel unit OLED may normally emit light when a signal output by the output track En' is at a low level, and there may still be a large amount of negative charges on the output track En' after the light emission of the pixel unit OLED is finished.

When the screen is turned on or awakened from hibernation, it belongs to a "power-on" process. Before the "power-on" process, a white picture or a picture full of stars flashes on the screen and then the screen returns to normal display, which is the flicker phenomenon, also known as the screen flashing. The reason for the screen flashing is that the negative charges on the output track En' cannot be released, which leads to the failure to reach a high potential on the output track En' in time during the "power-on" process of the screen, and the light-emitting control path is formed, and the positive and negative potentials of other signals have been established, which will cause the OLED to emit light. The phenomenon of "screen flashing during power-on" is more likely to occur when the screen is abnormally "power-off", such as forced power off by the user or other abnormal shutdown processes.

SUMMARY

For the problems existed in the related art, the present disclosure aims to provide a display panel, a turn-on driving method thereof and a display apparatus, which overcome the flicker problem when the display panel is turned on.

An embodiment of the present disclosure provides a display panel, including a display area and a non-display area surrounding the display area. The display area includes a plurality of rows of pixel units, the non-display area includes a light-emitting control signal driving circuit, and the light-emitting control signal driving circuit is connected to the pixel units. The light-emitting control signal driving circuit includes n cascaded driving circuit units, an output terminal of each of the driving circuit units is provided with an output track, and the output track is electrically connected to at least one row of pixel units and a transistor respectively. A first terminal of the transistor is connected to a first signal to control an on-off of the transistor through the first signal. A second terminal of the transistor is connected to a second signal, and a third terminal of the transistor is connected to the output track.

In some embodiments, the transistor is a P-type thin film transistor.

In some embodiments, the driving circuit units are arranged on one side or both sides of the display area.

In some embodiments, the clock signals of the driving circuit units respectively arranged on both sides of the display area are connected to each other.

In some embodiments, the display panel further includes a chip driving module configured to output the first signal and the second signal.

An embodiment of the present disclosure further provides a turn-on driving method for a display panel, which is applied to the display panel of any one of the above, and the method includes the following steps:

- before the display panel is turned on and powered on, setting the second signal at a conduction level, and maintaining the conduction level for a preset first period; and
- in response to that the second signal at the conduction level, setting the first signal at a conduction level, conducting the transistor, and delivering positive charges to the output track through the second terminal and the third terminal of the transistor.

In some embodiments, after setting the second signal at the conduction level, the method further includes the following steps:

- setting the first signal at the conduction level after waiting for a preset second period.

The second period is shorter than the first period.

In some embodiments, after delivering the positive charges to the output track, the method further includes the following steps:

- after waiting for a preset third period, setting the first signal at a turn-off level and turning off the transistor.

In some embodiments, after turning off the transistor, the method further includes the following steps:

- after waiting for a preset fourth period, setting the second signal at the turn-off level.

In some embodiments, after setting the second signal at the turn-off level, the method further includes the following steps:

- after waiting for a preset fifth period, providing a turn-on and power-on operation to the panel.

An embodiment of the present disclosure further provides a display apparatus, including the display panel of any one of the above.

The display panel, the turn-on driving method thereof and the display device provided by the present disclosure have the following advantages.

The display panel provided by the present disclosure includes a display area and a non-display area surrounding the display area. The display area includes a plurality of rows of pixel units, the non-display area includes a light-emitting control signal driving circuit, and the light-emitting control signal driving circuit is connected to the pixel units. The light-emitting control signal driving circuit includes n cascaded driving circuit units, an output terminal of each of the driving circuit units is provided with an output track, and the output track is electrically connected to at least one row of pixel units and a transistor respectively. A first terminal of the transistor is connected to a first signal to control an on-off of the transistor through the first signal. A second terminal of the transistor is connected to a second signal, and a third terminal of the transistor is connected to the output track. By connecting a transistor to the output track of the EOA circuit unit and charging the output track En with positive charges through the transistor, surplus negative charges on the output track En are neutralized, so that the output track En keeps a high potential before being turned on, thereby preventing the pixel units from emitting light, and improving a flicker problem occurred before the screen is powered on.

BRIEF DESCRIPTION OF THE DRAWINGS

Other features, objects and advantages of the present disclosure will become more apparent by reading the detailed description of non-limiting embodiments with reference to the following accompanying drawings.

REFERENCE SIGNS

Figure 1:
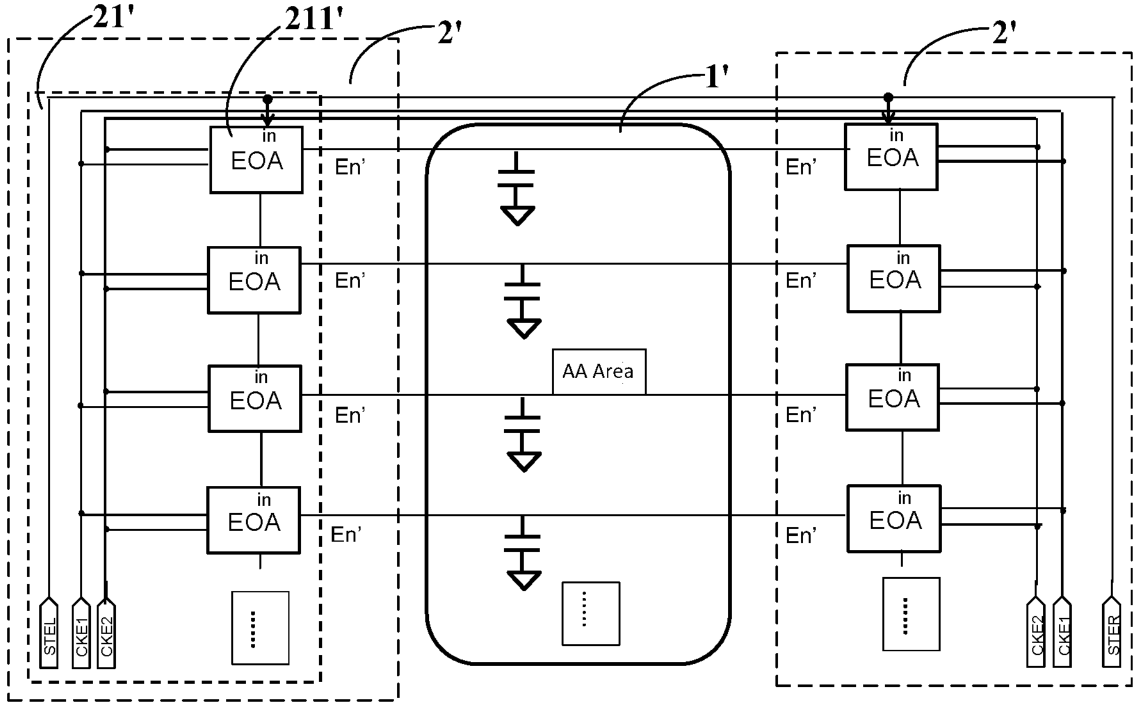
Fig. 1 PRIOR ART
FIG. 1 is a schematic diagram of a display panel in the prior art.
Figure 2:
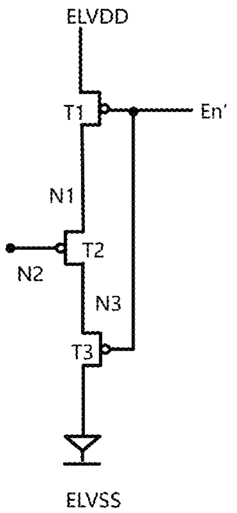
Fig. 2 PRIOR ART
FIG. 2 is a schematic diagram of a driving circuit of a display panel in the prior art.

1 Display Area
2 Non-display Area
21 EOA circuit
211 EOA circuit unit
3 Transistor
En Output Track

DETAILED DESCRIPTION

Example embodiments will now be described more fully with reference to the accompanying drawings. However, example embodiments can be embodied in various forms and should not be construed as being limited to the embodiments set forth herein. Rather, these embodiments are provided so that the present disclosure will be thorough and complete, and will fully convey the concepts of example embodiments to those skilled in the art. In the accompanying drawings, the same reference signs denote the same or similar structures, and therefore repeated descriptions thereof will be omitted. The words "or" or "either" in the specification may mean "and" or "or".

In the representation of the present disclosure, the representation with references to the terms "one embodiment", "some embodiments", "example", "specific example" or "some examples" mean that the specific features, structures, materials or characteristics represented in combination with this embodiment or example are included in at least one embodiment or example of the present specification. Moreover, the specific features, structures, materials or characteristics represented may be combined in any one or more embodiments or examples in a suitable manner. In addition, those skilled in the art may combine and integrate different embodiments or examples and features of the different embodiments or examples represented in the specification under the condition of not contradicting each other.

Throughout the specification, when a device is said to be "connected" or "coupled" to another device, this includes not only the case of a "direct connection" or "direct coupling", but also the case of an "indirect connection" or "indirect coupling" in which other element is placed between them. Although the terms "first", "second" and the like are used herein in some examples to represent various elements, these elements should not be limited by these terms. These terms are only used to distinguish one element from another, such as representations like a first interface and a second interface, etc. Furthermore, as used herein, the singular forms "a/an", "one" and "the" are intended to also include the plural forms, unless the context indicates to the contrary. It should be further understood that the terms "containing" and "including" indicate the presence of features, steps, operations, elements, components, items, categories and/or groups, but do not exclude the presence, appearance or addition of one or more other features, steps, operations, elements, components, items, categories and/or groups. The terms "or" and "and/or" as used herein are to be interpreted as inclusive or mean any one or any combination. Therefore, "A, B or C" or "A, B and/or C" means "any of the following: A; B; C; A and B; A and C; B and C; A, B and C". An exception to this definition occurs only when a combination of elements, functions, steps or operations are inherently mutually exclusive in some way.

Although not defined differently, all terms, including technical terms and scientific terms used herein, have the same meaning as commonly understood by those skilled in the art to which the present disclosure belongs. The terms defined in commonly used dictionaries are additionally interpreted as having meanings consistent with the contents of the relevant technical documents and the current tips. As long as they are not defined, the terms shall not be excessively interpreted as ideal or very formulaic meanings.

Figure 3:
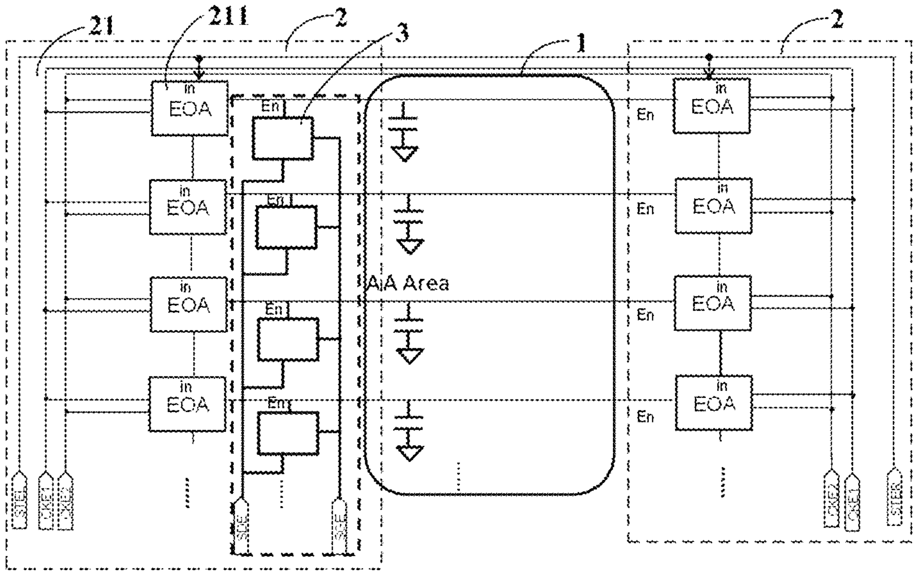
FIG. 3 is a schematic diagram of a display panel according to an embodiment of the present disclosure.

In order to solve the problems existed in the related art, as shown in FIG. 3, the present disclosure provides a display panel, including:

a display area 1 and a non-display area 2 surrounding the display area 1.

The display area 1 includes a plurality of rows of pixel units (not shown), and the non-display area 2 includes a light-emitting control signal driving circuit 21, that is, an EOA circuit. The light-emitting control signal driving circuit is connected to the pixel units to control the light emission of the pixel units.

The EOA circuit 21 includes n cascaded driving circuit units 211 (i.e., EOA circuit units 211), and an output terminal of each of the EOA circuit units 211 is provided with an output track En, which is electrically connected to at least one row of the pixel units and a transistor 3 respectively. A first terminal of the transistor 3 is connected to a first signal to control an on-off of the transistor 3 through the first signal. A second terminal of the transistor 3 is connected to a second signal, and a third terminal of the transistor 3 is connected to the output track En. When the transistor is conducted, positive charges are delivered to the output track En through the second terminal and the third terminal of the transistor, thereby neutralizing surplus negative charges on the output track En, preventing the pixel units from emitting light before power-on, and improving a flicker problem occurred before the screen is powered on.

In this embodiment, the transistor 3 is a P-type thin film transistor, the first terminal of the transistor 3 is a gate electrode, the second terminal of the transistor is a source electrode, and the third terminal of the transistor is a drain electrode. Current flows from the source electrode to the drain electrode.

Specifically, the EOA circuit units 211 may be arranged on a single side of the display area 1 for unilateral driving, or on both sides of the display area 1 for bilateral driving, which is not specifically limited herein. As shown in FIG. 3, in this embodiment, the EOA driving circuit units 211 are arranged on both sides of the display area 1, and the EOA driving circuits 21 drive bilaterally. Further, in this embodiment, clock signals of the EOA circuit units respectively arranged on both sides of the display area 1 are connected to each other. In another embodiment, the clock signals of the EOA circuit units respectively arranged on the display area 1 may be independently set, that is, set to be non-connected to each other, which does not affect the function of the EOA circuit.

Figure 4:
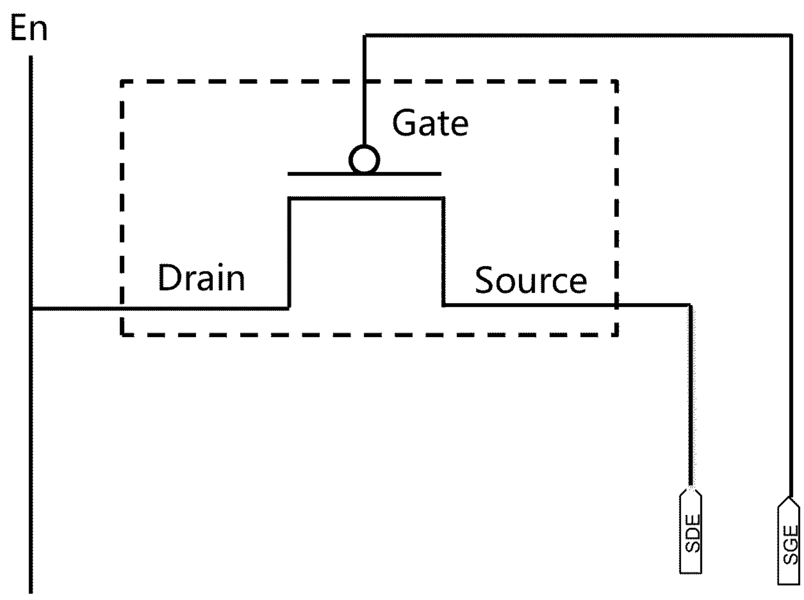
FIG. 4 is a schematic diagram of a transistor according to an embodiment of the present disclosure.

Further, the display panel 1 further includes a chip driving module (not shown), pins are provided in the terminal area of the display panel, and the chip driving module is configured to output the first signal SGE and the second signal SDE. As shown in FIG. 4, the first signal SGE is connected to the first terminal (the gate electrode) of the transistor 3, and the first signal SGE is used to control the on-off of the transistor 3. The second signal SDE is connected to the second terminal (the source electrode) of the transistor 3. When the transistor 3 is conducted, current flows through the second terminal of the transistor 3 to the third terminal of the transistor 3, thereby providing positive charges to the output track En to neutralize the surplus negative charges on the output track En and prevent the pixel units from emitting light before the screen is powered on. In an embodiment, the transistor 3 may be arranged unilaterally. In another embodiment, the transistor 3 may also be arranged bilaterally. In still another embodiment, it is set that different transistors 3 correspond to different output tracks En. In other embodiments, it may also be set that all output tracks En share one transistor 3, which is not specifically limited herein, and the user may reasonably set the number and position of the transistors according to actual needs.

Figure 5:
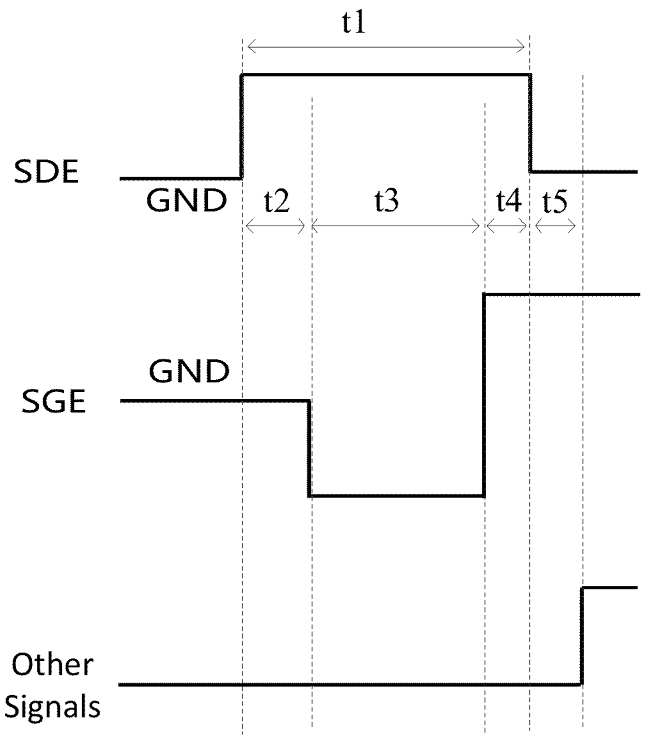
FIG. 5 is a timing diagram of a turn-on driving method for a display panel according to an embodiment of the present disclosure.
Figure 6:
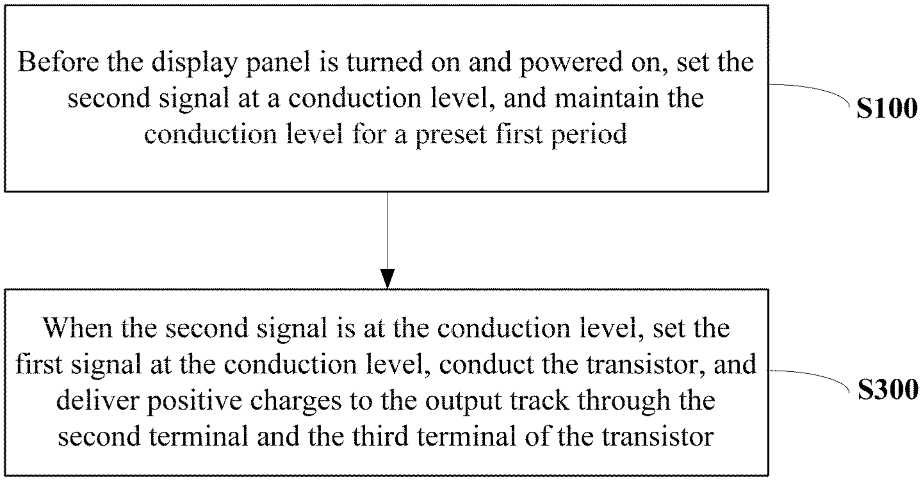
FIG. 6 is a flowchart of a turn-on driving method for a display panel according to an embodiment of the present disclosure.

As shown in FIG. 5 and FIG. 6, an embodiment of the present disclosure further provides a turn-on driving method for a display panel, applied to the display panel as described above, and the method includes the following steps.

In S100: before the display panel is turned on and powered on, the second signal SDE is set at a conduction level, and maintains the conduction level for a preset first period t1.

In S300: when the second signal SDE is at the conduction level, the first signal SGE is set at a conduction level, the transistor 3 is conducted, and a positive charge is delivered to the output track En through the second terminal and the third terminal of the transistor 3.

In this embodiment, the conduction level of the second signal SDE is a high level, and the turn-off level of the second signal SDE is a low level. The conduction level of the first signal SGE is a low level, and the turn-off level of the first signal SGE is a high level. When the first signal SGE is at a low level, the transistor 3 is conducted. At this time, the second terminal (the source electrode) of the transistor 3 delivers positive charges to the third terminal (the drain electrode) of the transistor, thereby neutralizing the surplus negative charges on the output track En, keeping the track En at a high level, turning off the light-emitting path of the pixel units in the display area, preventing the pixel units from being turned on and emitting light before power-on, and improving the flicker problem occurred before the screen is powered on.

Specifically, after the step S100 of setting the second signal SDE at the conduction level, the method further includes the following steps.

In S200: after waiting for a preset second period t2, the first signal SGE is set at the conduction level.

The second period t2 is shorter than the first period t1.

After the second signal SDE is set at the conduction level, and waiting for the second period t2, the first signal SGE is set at the conduction level to conduct the transistor 3, which is convenient for the transistor 3 to quickly charge the output track En after being conducted, quickly change the potential on the output track En, and improve the charging efficiency of the output track En.

Further, after the step of delivering the positive charges to the output track En, the method further includes the following steps.

In S400: after waiting for a preset third period t3, the first signal SGE is set at a turn-off level, and the transistor 3 is turned off.

After charging of the output track En is completed, the potential of the second terminal and the third terminal of the transistor 3 is maintained, that is, the high potential of the output track En is maintained.

Further, after the step S400 of turning off the transistor 3, the method further includes the following steps.

In S500: after waiting for a preset fourth period t4, the second signal SDE is set at the turn-off level; at this point, the charging process of the delivering track En is finished.

Further, after the step 500 of setting the second signal SDE at the turn-off level, the method further includes the following steps.

In S600: after waiting for a preset fifth period t5, a turn-on and power-on operation is provided to the display panel; at this time, the screen will no longer flash.

When the charging is completed, the turn-on and power-on operation is provided to the panel again. Because the output track En is at a high potential, the output track En will not affect the light emission of the pixel units of the panel, so there is no flicker on the screen.

An embodiment of the present disclosure further provides a display apparatus, the display apparatus includes the display panel as described above, and thus can obtain all the technical effects of the above-mentioned display panel, which are not elaborated herein. The display apparatus may be a mobile phone, a tablet, a notebook, a desktop computer, an advertising screen, an electronic watch and the like.

The display panel, the turn-on driving method thereof and the display apparatus provided by the present disclosure have the following advantages.

The display panel provided by the present disclosure includes a display area and a non-display area surrounding the display area. The display area includes a plurality of rows of pixel units, the non-display area includes a light-emitting control signal driving circuit, and the light-emitting control signal driving circuit is connected to the pixel units. The light-emitting control signal driving circuit includes n cascaded driving circuit units, an output terminal of each of the driving circuit units is provided with an output track, and the output track is electrically connected to at least one row of pixel units and a transistor respectively. A first terminal of the transistor is connected to a first signal to control the on-off of the transistor through the first signal. A second terminal of the transistor is connected to a second signal, and a third terminal of the transistor is connected to the output track. By connecting a transistor to the output track of the EOA circuit unit and charging the output track En with positive charges through the transistor, surplus negative charges on the output track En are neutralized, so that the output track En keeps a high potential before being turned on, thereby preventing the pixel units from emitting light, and improving a flicker problem occurred before the screen is powered on.

The above content is a further detailed description of the present disclosure in conjunction with specific embodiments, and it cannot be considered that the specific implementation of the present disclosure is limited to these descriptions. For those of ordinary skill in the art, without departing from the concept of the present disclosure, some simple deductions or substitutions may be made, all of which should be regarded as falling within the scope of protection of the present disclosure.

What is claimed is:

1. A display panel, comprising: a display area and a non-display area surrounding the display area;

wherein the display area comprises a plurality of rows of pixel units, the non-display area comprises a light-emitting control signal driving circuit, and the light-emitting control signal driving circuit is connected to the plurality of rows of pixel units; and wherein the light-emitting control signal driving circuit comprises n cascaded driving circuit units, an output terminal of each of the n cascaded driving circuit units is provided with an output track, and wherein the output track is electrically connected to at least one row of the plurality of rows of pixel units and a transistor respectively, wherein the transistor is provided outside the n cascaded driving circuit units;

wherein a first terminal of the transistor is connected to a first signal to control a switch-on and a switch-off of the transistor through the first signal; a second terminal of the transistor is connected to a second signal, and a third terminal of the transistor is connected to the output track, wherein n is a number of the n cascaded driving circuit units, wherein in response to the transistor being switched on, positive charges are delivered to the output track through the second terminal and the third terminal of the transistor, wherein the positive charges are delivered to the output track before the display panel is turned on.

2. The display panel according to claim 1, wherein the transistor is a P-type thin film transistor.

3. The display panel according to claim 1, wherein the n cascaded driving circuit units are arranged on one side or both sides of the display area.

4. The display panel according to claim 3, wherein clock signals of the n cascaded driving circuit units respectively are arranged on both sides of the display area and are connected to each other.

5. The display panel according to claim 1, further comprising a chip driving module configured to output the first signal and the second signal.

6. A turn-on driving method for a display panel, wherein the display panel comprises: a display area and a non-display area surrounding the display area;

wherein the display area comprises a plurality of rows of pixel units, the non-display area comprises a light-emitting control signal driving circuit, and the light-emitting control signal driving circuit is connected to the plurality of rows of pixel units; and wherein the light-emitting control signal driving circuit comprises n cascaded driving circuit units, an output terminal of each of the n cascaded driving circuit units is provided with an output track, and wherein the output track is electrically connected to at least one row of the plurality of rows of pixel units and a transistor respectively, wherein the transistor is provided outside the n cascaded driving circuit units;

wherein a first terminal of the transistor is connected to a first signal to control a switch-on and a switch-off of the transistor through the first signal; a second terminal of the transistor is connected to a second signal, and a third terminal of the transistor is connected to the output track, wherein n is a number of the n cascaded driving circuit units;

wherein the turn-on driving method for the display panel comprises steps of:

before the display panel is turned on, setting the second signal at a conduction level, and maintaining the conduction level for a preset first period; and in response to the second signal being at the conduction level, setting the first signal at a conduction level, to switch-on the transistor, and delivering positive charges to the output track through the second terminal and the third terminal of the transistor, wherein the positive charges are delivered to the output track before the display panel is turned on.

7. The turn-on driving method for the display panel according to claim 6, wherein after the setting of the second signal to be at the conduction level, the method further comprises steps of:

after waiting for a preset second period, setting the first signal to the conduction level;

wherein the preset second period is shorter than the first period.

8. The turn-on driving method for the display panel according to claim 7, wherein after delivering the positive charges to the output track, the method further comprises steps of:

after waiting for a preset third period, setting the first signal to a turn-off level and turning off the transistor.

9. The turn-on driving method for the display panel according to claim 8, wherein after turning off the transistor, the method further comprises steps of:

after waiting for a preset fourth period, setting the second signal to the turn-off level.

10. The turn-on driving method for the display panel according to claim 9, wherein after the setting of the second signal to be at the turn-off level, the method further comprises steps of:

after waiting for a preset fifth period, providing a turn-on and power-on operation to the display panel.

11. The turn-on driving method for the display panel according to claim 6, wherein the transistor is a P-type thin film transistor.

12. The turn-on driving method for the display panel according to claim 11, wherein clock signals of the n cascaded driving circuit units respectively are arranged on both sides of the display area and are connected to each other.

13. The turn-on driving method for the display panel according to claim 6, wherein n cascaded the driving circuit units are arranged on one side or both sides of the display area.

14. The turn-on driving method for the display panel according to claim 6, wherein the display panel further comprises a chip driving module configured to output the first signal and the second signal.

15. A display apparatus comprising a display panel, wherein the display panel comprises: a display area and a non-display area surrounding the display area;

wherein the display area comprises a plurality of rows of pixel units, the non-display area comprises a light-emitting control signal driving circuit, and the light-emitting control signal driving circuit is connected to the plurality of rows of pixel units; and wherein the light-emitting control signal driving circuit comprises n cascaded driving circuit units, an output terminal of each of the n cascaded driving circuit units is provided with an output track, and wherein the output track is electrically connected to at least one row of the plurality of rows of pixel units and a transistor respectively, wherein the transistor is provided outside the n cascaded driving circuit units;

wherein a first terminal of the transistor is connected to a first signal to control a switch-on and a switch off of the transistor through the first signal; a second terminal of the transistor is connected to a second signal, and a third terminal of the transistor is connected to the output track, wherein n is a number of the n cascaded driving circuit units, wherein in response to the transistor being switched on, positive charges are delivered to the output track through the second terminal and the third terminal of the transistor, wherein the positive charges are delivered to the output track before the display panel is turned on.

16. The display apparatus according to claim 15, wherein the transistor is a P-type thin film transistor.

17. The display apparatus according to claim 15, wherein the n cascaded driving circuit units are arranged on one side or both sides of the display area.

18. The display apparatus according to claim 17, wherein clock signals of the n cascaded driving circuit units respectively are arranged on both sides of the display area and are connected to each other.

19. The display apparatus according to claim 15, further comprising a chip driving module configured to output the first signal and the second signal.

* * * * *